United States Patent
Kupratis

(10) Patent No.: US 10,378,454 B2
(45) Date of Patent: Aug. 13, 2019

(54) GAS TURBINE ENGINE WITH TWO-SPOOL FAN AND VARIABLE VANE TURBINE

(71) Applicant: United Technologies Corporation, Farmington, CT (US)

(72) Inventor: Daniel Bernard Kupratis, Wallingford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 836 days.

(21) Appl. No.: 14/994,245

(22) Filed: Jan. 13, 2016

(65) Prior Publication Data

US 2016/0186667 A1 Jun. 30, 2016

Related U.S. Application Data

(62) Division of application No. 13/287,073, filed on Nov. 1, 2011, now Pat. No. 9,279,388.

(51) Int. Cl.

| F02C 9/22 | (2006.01) |
|---|---|
| F02K 3/075 | (2006.01) |
| F02K 3/077 | (2006.01) |
| F02C 9/52 | (2006.01) |
| F02C 9/54 | (2006.01) |

(52) U.S. Cl.
CPC ............. *F02C 9/22* (2013.01); *F02C 9/52* (2013.01); *F02C 9/54* (2013.01); *F02K 3/075* (2013.01); *F02K 3/077* (2013.01); *F05D 2220/36* (2013.01)

(58) Field of Classification Search
CPC ...... F02C 9/52; F02C 9/54; F02C 9/22; F02K 3/075; F02K 3/077; F05D 2220/36
See application file for complete search history.

(56) References Cited

U.S. PATENT DOCUMENTS

| 3,514,952 A | * | 6/1970 | Schumacher | ........... F02K 3/075 60/225 |
|---|---|---|---|---|
| 3,867,813 A | | 2/1975 | Leibach | |
| 4,043,121 A | * | 8/1977 | Thomas | .................. F02K 3/075 415/78 |
| 4,064,692 A | * | 12/1977 | Johnson | .................. F02K 3/075 60/762 |
| 4,069,661 A | * | 1/1978 | Rundell | .................. F02K 3/075 60/204 |

(Continued)

FOREIGN PATENT DOCUMENTS

| EP | 1510682 | 3/2005 |
|---|---|---|
| EP | 1988274 | 11/2008 |

(Continued)

OTHER PUBLICATIONS

Combined Search and Examination Report for Great Britain Patent Application No. GB1219481.7 dated Feb. 19, 2013.

*Primary Examiner* — Carlos A Rivera
(74) *Attorney, Agent, or Firm* — Carlson, Gaskey & Olds, P.C.

(57) ABSTRACT

A method of operating a gas turbine engine includes modulating a variable high pressure turbine inlet guide vane of a high pressure spool to performance match a first stage fan section of a low pressure spool and an intermediate stage fan section of an intermediate spool to maintain a generally constant engine inlet flow while varying engine thrust.

11 Claims, 3 Drawing Sheets

(56) References Cited

U.S. PATENT DOCUMENTS

| | | | |
|---|---|---|---|
| 4,080,785 A * | 3/1978 | Koff | F02K 3/075 |
| | | | 415/69 |
| 4,175,384 A * | 11/1979 | Wagenknecht | F02K 3/075 |
| | | | 60/226.3 |
| 4,221,114 A * | 9/1980 | Wilde | F02C 9/20 |
| | | | 60/233 |
| 4,222,233 A * | 9/1980 | Johnson | B64C 29/005 |
| | | | 60/225 |
| 4,909,031 A | 3/1990 | Grieb | |
| 5,383,332 A | 1/1995 | Angel | |
| 6,901,739 B2 | 6/2005 | Christopherson | |
| 6,948,317 B2 | 9/2005 | Renggli et al. | |
| 7,216,475 B2 | 5/2007 | Johnson | |
| 7,246,484 B2 | 7/2007 | Giffin et al. | |
| 7,412,819 B2 | 8/2008 | Bart et al. | |
| 7,614,210 B2 | 11/2009 | Powell et al. | |
| 7,877,980 B2 | 2/2011 | Johnson | |
| 2003/0066294 A1* | 4/2003 | Mannarino | F04D 27/0246 |
| | | | 60/773 |
| 2004/0055310 A1* | 3/2004 | Mannarino | F04D 27/0246 |
| | | | 60/794 |
| 2007/0000232 A1 | 1/2007 | Powell et al. | |
| 2009/0145102 A1 | 6/2009 | Roberge et al. | |
| 2010/0154383 A1 | 6/2010 | Ress, Jr. | |
| 2013/0104522 A1 | 5/2013 | Kupratis | |

FOREIGN PATENT DOCUMENTS

| | | |
|---|---|---|
| GB | 1436796 | 5/1976 |
| GB | 1493049 | 11/1977 |
| GB | 2038948 | 7/1980 |
| GB | 2444839 | 6/2008 |

\* cited by examiner

GAS TURBINE ENGINE WITH TWO-SPOOL FAN AND VARIABLE VANE TURBINE

CROSS-REFERENCE TO RELATED APPLICATIONS

This disclosure is a divisional of U.S. patent application Ser. No. 13/287,073 filed Nov. 1, 2011.

The present disclosure relates to gas turbine engines, and more particularly to a 3 spool variable cycle gas turbine engine.

Variable cycle engines power high performance aircraft over a range of operating conditions yet achieve countervailing objectives such as high specific thrust and low fuel consumption. The variable cycle engine essentially alters a bypass ratio during flight to match varying requirements. This facilitates efficient performance over a broad range of altitudes and flight conditions to generate high thrust when needed for high energy maneuvers yet also optimize fuel efficiency for cruise or loiter conditions.

SUMMARY

In one exemplary embodiment, a method of operating a gas turbine engine includes modulating a variable high pressure turbine inlet guide vane of a high pressure spool to performance match a first stage fan section of a low pressure spool and an intermediate stage fan section of an intermediate spool to maintain a generally constant engine inlet flow while varying engine thrust.

In a further embodiment of any of the above, the method includes modulating a variable area throat of a third stream bypass flow path to a third stream exhaust nozzle downstream of the first stage fan section.

In a further embodiment of any of the above, the variable area throat includes a flow control mechanism located downstream of an inlet to the third stream bypass flow path.

In a further embodiment of any of the above, the third stream bypass flow path is located radially outboard of a second stream bypass flow path.

In a further embodiment of any of the above, a second stage fan section is located downstream of said inlet to said third stream bypass flow path.

In a further embodiment of any of the above, the method includes modulating variable low pressure turbine inlet guide vanes in response to an airspeed. Modulating variable intermediate pressure turbine inlet guide along the intermediate spool in response to the airspeed.

In a further embodiment of any of the above, the method includes modulating open the variable low pressure turbine inlet guide vanes in response to the airspeed being less than a desired airspeed. Modulating closed the variable intermediate pressure turbine inlet guide along the intermediate spool in response to the airspeed being less than the desired airspeed.

In a further embodiment of any of the above, the method includes modulating closed the variable low pressure turbine inlet guide vanes in response to the airspeed being greater than a desired airspeed. Modulating open the variable intermediate pressure turbine inlet guide along the intermediate spool in response to the airspeed being greater than the desired airspeed.

In a further embodiment of any of the above, the method includes modulating variable high pressure turbine inlet guide along the high spool in response to a derivate of a fuel flow rate. Modulating a variable area throat of a third stream exhaust nozzle downstream of the first stage fan section in response to a derivate of a fuel flow rate.

In a further embodiment of any of the above, the method includes modulating open the variable high pressure turbine inlet guide along the high spool in response to the derivate of a fuel flow rate increasing. Modulating closed the variable area throat of a third stream exhaust nozzle downstream of the first stage fan section in response to the derivate of the fuel flow rate increasing.

In a further embodiment of any of the above, the method includes modulating open the variable area throat of a third stream exhaust nozzle downstream of the first stage fan section in response to the derivate of the fuel flow rate decreasing.

In a further embodiment of any of the above, the method includes modulating variable low pressure turbine inlet guide vanes in response to a speed of the intermediate stage fan section. Modulating variable intermediate pressure turbine inlet guide along the intermediate spool in response to the speed of the intermediate stage fan section.

In a further embodiment of any of the above, the method includes modulating variable low pressure turbine inlet guide vanes in response to a speed of the intermediate stage fan section changing at a desire rate. Modulating variable intermediate pressure turbine inlet guide along the intermediate spool in response to the speed of the intermediate stage fan section changing at the desire rate.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
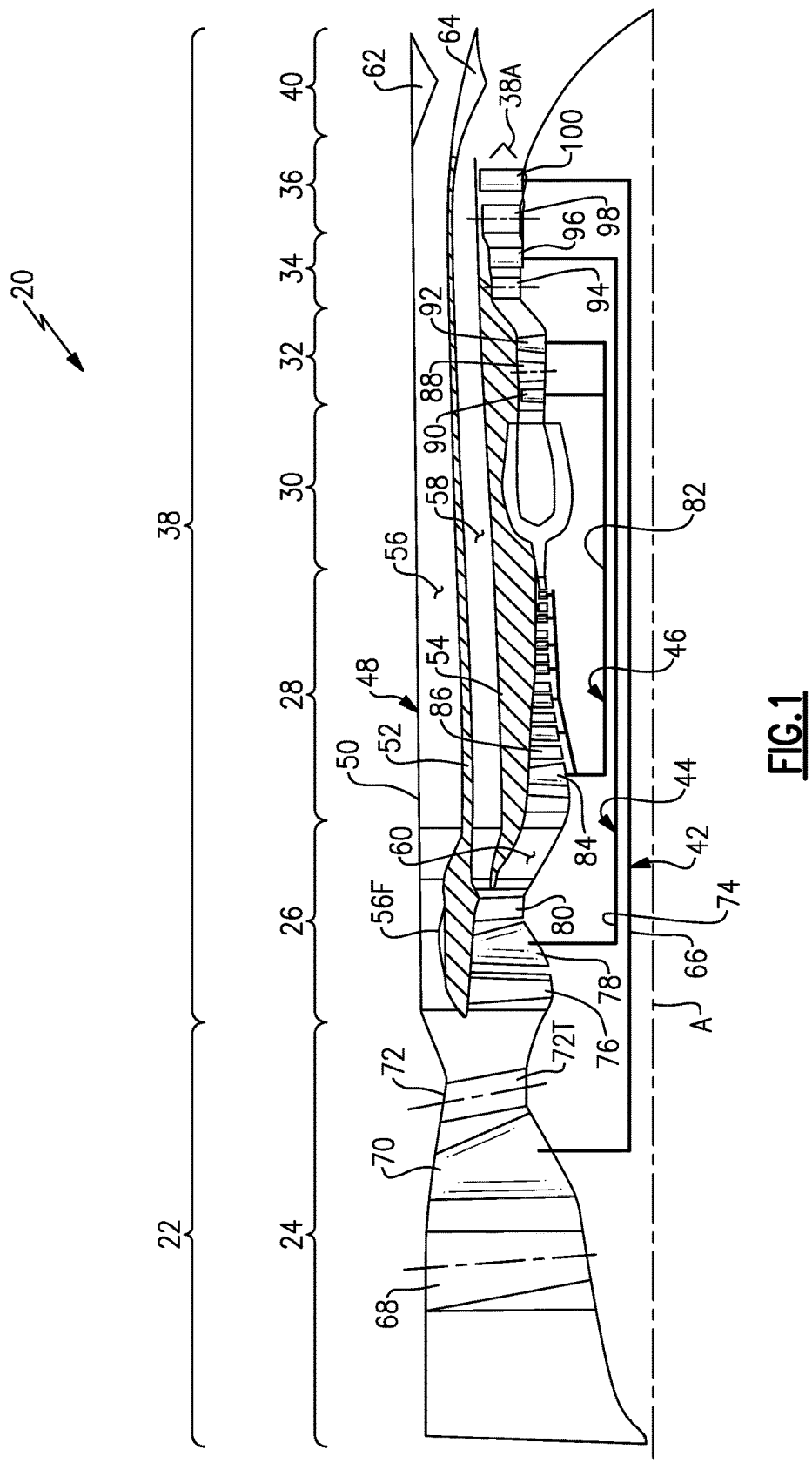
FIG. 1 is a general schematic view an exemplary variable cycle two-spool gas turbine engine according to one non-limiting embodiment.

FIG. 1 schematically illustrates a gas turbine engine 20. The gas turbine engine 20 is disclosed herein as a variable cycle three-spool bypass turbofan that generally includes a fan section 22 with a first stage fan section 24, an intermediate stage fan section 26, a high pressure compressor section 28, a combustor section 30, a high pressure turbine section 32, an intermediate turbine section 34, a low pressure turbine section 36, a bypass duct section 38 and a nozzle section 40. Additional sections may include an augmentor section 38A among other systems or features such as a geared architecture which may be located in various other engine sections than that shown such as, for example, aft of the LPT. The sections are defined along a central longitudinal engine axis A.

The engine 20 generally includes a low spool 42, an intermediate spool 44 and a high spool 46 which rotate about the engine central longitudinal axis A relative to an engine case structure 48. It should be appreciated that other architectures, such as a three-spool architecture, will also benefit herefrom.

The engine case structure 48 generally includes an outer case structure 50, an intermediate case structure 52 and an inner case structure 54. It should be understood that various structures individual or collectively within the engine may define the case structures 50, 52, 54 to essentially define an exoskeleton that supports the spools 42, 44, 46 for rotation therein.

The first stage fan section 24 communicates fan flow through a flow control mechanism 56F into a third stream bypass flow path 56 as well as into a second stream bypass flow path 58, and a core flow path 60. The flow control mechanism 56F may include various structures such as pneumatic or mechanical operated blocker doors that operate as a throttle point to define a variable area throat and selectively control flow through the third stream bypass flow path 56 such that a selective percentage of flow from the first stage fan section 24 is divided between the third stream bypass flow path 56 and both the second stream bypass flow path 58 and core flow path 60. In the disclosed non-limiting embodiment, the flow control mechanism 56F may throttle the flow into the third stream bypass flow path 56 down to a minimal but non-zero flow.

The intermediate stage fan section 26 communicates intermediate fan flow into the second stream bypass flow path 58 and the core flow path 60. The intermediate stage fan section 26 is radially inboard and essentially downstream of the flow control mechanism 56F such that all flow from the intermediate stage fan section 26 is communicated into the second stream bypass flow path 58 and the core flow path 60.

The high pressure compressor section 28, the combustor section 30, the high pressure turbine section 32, the intermediate turbine section 34, and the low pressure turbine section 36 are in the core flow path 60. These sections are referred to herein as the engine core.

The core airflow is compressed by the first stage fan section 24, the intermediate stage fan section 26, the high pressure compressor section 28, mixed and burned with fuel in the combustor section 30, then expanded over the high pressure turbine section 32, the intermediate turbine section 34, and the low pressure turbine section 36. The turbines 32, 34, 36 rotationally drive the respective low spool 42, intermediate spool 44 and the high spool 46 in response to the expansion.

The third stream bypass flow path 56 is generally defined by the outer case structure 50 and the intermediate case structure 52. The second stream bypass duct 54 is generally defined by the intermediate case structure 52 and the inner case structure 54. The core flow path 60 is generally defined by the inner case structure 54. The second stream bypass flow path 58 is defined radially inward of the third stream bypass flow path 56 and the core flow path 60 is radially inward of the core flow path 60.

The nozzle section 40 may include a third stream exhaust nozzle 62 (illustrated schematically) which receives flow from the third stream bypass flow path 56 and a mixed flow exhaust nozzle 64 which receives a mixed flow from the second stream bypass duct 54 and the core flow path 60. It should be understood that various fixed, variable, convergent/divergent, two-dimensional and three-dimensional nozzle systems may be utilized herewith.

The first stage fan section 24 and the low pressure turbine section 36 are coupled by a low shaft 66 to define the low spool 42. In the disclosed non-limiting embodiment, the first stage fan section 24 includes a first stage variable inlet guide vane 68, a first stage fan rotor 70, and a first stage variable stator 72. It should be appreciated that various systems may be utilized to activate the variable inlet guide vanes and variable stators. It should also be understood that other fan stage architectures may alternatively or additionally be provided such as various combinations of a fixed or variable inlet guide vane 68 and a fixed or variable stator 72. The first stage variable stator 72 is upstream of the flow control mechanism 56F.

The intermediate stage fan section 26 and the intermediate pressure turbine section 34 are coupled by an intermediate shaft 74 to define the intermediate spool 44. In the disclosed non-limiting embodiment, the intermediate stage fan section 26 includes an intermediate stage variable inlet guide vane 76, an intermediate fan rotor 78, and an intermediate stage stator 80. The intermediate stage variable inlet guide vane 76 is immediately downstream of the first stage variable stator 72. It should be understood that other fan stage architectures may alternatively or additionally be provided such as various combinations of a fixed or variable intermediate stage variable inlet guide vane 76 and a fixed or variable intermediate stage stator 80.

The high pressure compressor section 28 and the high pressure turbine section 32 are coupled by a high shaft 82 to define the high spool 46. In the disclosed non-limiting embodiment, the high pressure compressor section 28 upstream of the combustor section 30 includes a multiple of stages each with a rotor 84 and vane 86. It should be understood that the high pressure compressor section 28 may alternatively or additionally include other compressor section architectures which, for example, include additional or fewer stages each with or without various combinations of variable or fixed guide vanes. It should also be understood that each of the turbine sections 32, 34, 36 may alternatively or additionally include other turbine architectures which, for example, include additional or fewer stages each with or without various combinations of variable or fixed guide vanes.

The high pressure turbine section 32 in the disclosed non-limiting embodiment, includes a multiple of stages (two shown) with variable high pressure turbine inlet guide vanes (HPT vanes) 88 between a first stage high pressure turbine rotor 90 and a second stage high pressure turbine rotor 92.

The intermediate pressure turbine section 34 in the disclosed non-limiting embodiment, includes a single stage with variable intermediate pressure turbine inlet guide vanes (IPT vanes) 94 upstream of an intermediate pressure turbine rotor 96. The intermediate pressure turbine section 34 is generally between the high pressure turbine section 32 and the low pressure turbine section 36 in the core flow path.

The low pressure turbine section 36 in the disclosed non-limiting embodiment, includes a single stage with variable low pressure turbine inlet guide vanes (LPT vanes) 98 upstream of a low pressure turbine rotor 100. The low pressure turbine section 36 is the last turbine section within the core flow path 60 and thereby communicates with the mixed flow exhaust nozzle 64 which receives a mixed flow from the second stream bypass duct 54 and the core flow path 60. The augmentor section 38A among other systems or features may be located immediately downstream of the low pressure turbine section 36.

The first stage variable stator 72 downstream of the variable pitch fan rotor 70 may further include a variable pitch mechanism such as a variable pitch trailing edge flap 72T. The pitch change provided by the variable pitch first stage fan rotor 70 and or the first stage variable stator 72 facilitates a reduced articulation requirements for the variable turbine vanes 88, 94, 98 as well as the potential to utilize a fixed exhaust nozzle as the third stream exhaust nozzle 62.

Air which enters the first stage fan section 24 is divided between the third stream bypass flow path 56, the second stream bypass flow path 58, and the core flow path 60 in response to a position of the flow control mechanism 56F. That is, bypass flow into the third stream bypass flow path 56 is controlled. The intermediate stage fan section 26 is radially inboard and essentially downstream of the flow control mechanism 56F such that essentially all flow from the intermediate stage fan section 26 is communicated into the second stream bypass flow path 58 and the core flow path 60. The variable turbine vanes 88, 94, 98 in the respective turbine sections 32, 34, 36 facilitate performance matching for the first stage fan section 24 and the intermediate stage fan section 26 simultaneously to thereby maintain constant engine inlet flow while modulating engine thrust.

Figure 2:
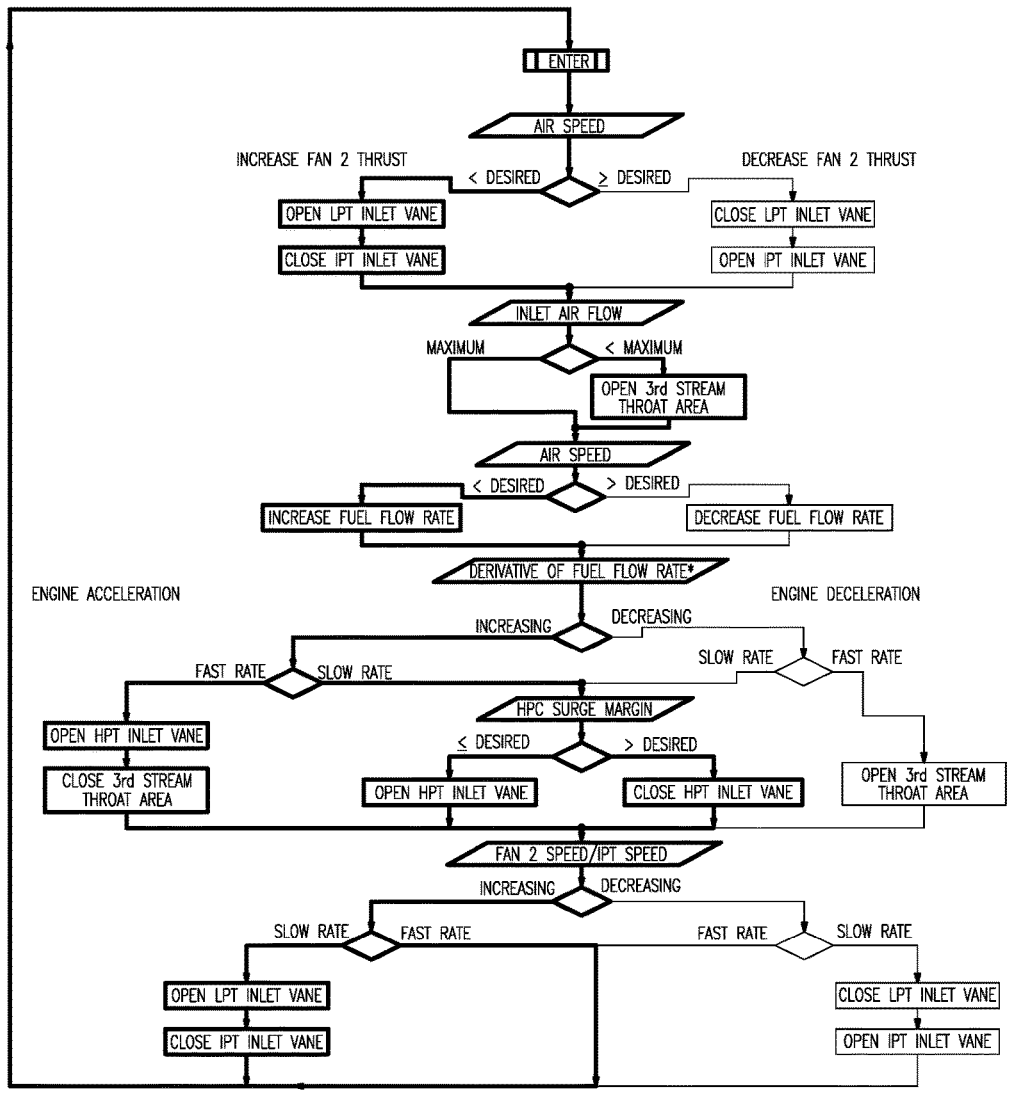
FIG. 2 is a block diagram of a two-spool fan control algorithm (FCA) for operation of the variable cycle two-spool gas turbine engine with the acceleration logic flow emphasized.

With reference to FIG. 2, a logic diagram for a two-spool fan control algorithm (FCA) 200 is schematically illustrated. The functions of the algorithm 200 are disclosed in terms of a block diagram. Generally, the rectangles represent actions; the parallelograms represent data; and the diamonds represent decision points. It should be understood by those skilled in the art with the benefit of this disclosure that these functions may be enacted in either dedicated hardware circuitry or programmed software routines capable of execution in a microprocessor based electronics control embodiment.

A module 202 may be utilized to execute the two-spool fan control algorithm (FCA) 200. In one non-limiting embodiment, the module 202 may be an engine FADEC, a portion of a flight control computer, a portion of a central vehicle control, an interactive vehicle dynamics simulator unit or other system. The module typically includes a processor; a memory and an interface. The processor may be any type of known microprocessor having desired performance characteristics. The memory may be computer readable medium which stores the data and control algorithms described herein. The interface facilitates communication with the engine 20 as well as other avionics and vehicle systems.

Generally, the first stage fan section 24 is speed matched to the intermediate stage fan section 26 to minimize spillage drag. Thrust changes are primarily effected with control of the flow and pressure ratios through the second stream bypass flow path 58 with the intermediate spool 44.

The rate of fuel flow will be the predominant effect on engine thrust performance, but the second effect after that is the variable high pressure turbine inlet guide vane 88; the third effect is the variable low pressure turbine inlet guide vane 98; the fourth effect is the variable intermediate pressure turbine inlet guide vane 94 and then the fifth effect is the flow control mechanism 56F to control the third stream bypass flow path 56. The variable turbine vanes 88, 98, 94 thereby facilitate performance matching for first stage fan section 24 and the intermediate stage fan section 26 simultaneously to maintain engine inlet flow constant while modulating engine thrust.

Acceleration Scenario

With reference to FIG. 2, under a scenario in which the aircraft airspeed is less than desired, the engine is accelerated as illustrated generally by the left side logic of the two-spool fan control algorithm (FCA) 200. Initially, the thrust from the intermediate stage fan section 26 is increased through an open modulation of the LPT vanes 98 and a close modulation of the IPT vanes 94. That is, even with no throttle change, a resplit of flow to the first stage fan section 24 and the intermediate stage fan section 26 effects a thrust change through the modulation of the LPT vanes 98 and the IPT vanes 94. It should be understood that modulation as utilized herein is inclusive but not limited to any change in any or each of the turbine sections 32, 34, 36.

As inlet air flow has an impact on spillage drag, it is desired to maximize inlet flow such that if inlet air flow is at maximum, the logic continues. If the inlet air flow is below maximum, the third stream bypass flow path 56 is modulated toward a more open position through the flow control mechanism 56F.

Then, airspeed is again checked because the third stream bypass flow path 56 may be modulated toward a more open position through the flow control mechanism 56F such that drag will be relatively decreased, but thrust may be correspondingly reduced. That is, the change in the third stream bypass flow path 56 has a relatively smaller impact of thrust capability, so if the thrust change was not that which is desired, the logic then changes the throttle and, in this increase thrust scenario, increases the fuel flow rate Then, there is the rate of change of the fuel flow schedule identified as the derivative of the fuel flow rate. Alternatively, Nh dot may be utilized where Nh is high spool speed (rpm) and Nh dot is rev/min/min. So if the desired change is rapid such as a snap acceleration, the HPT vanes 88 are modulated open and the third stream bypass flow path 56 is modulated toward a more closed position through the flow control mechanism 56F. To effectuate the snap acceleration, the flow control mechanism 56F may be rapidly closed as that forces the first stage fan section 24 to a higher pressure ratio. To also effectively accommodate the snap acceleration and assure the desired HPC surge margin, the HPT vanes 88 are modulated closed if the HPC surge margin is greater than desired or the HPT vanes 88 are modulate open if the HPC surge margin is less than desired to thereby accommodate the thrust increase.

If the desired airspeed change is relatively gentle, then, depending on whether or not there is adequate surge margin which is adjusted as described above, the logic basically passes through to the speed check of the intermediate stage fan section 26.

If the speed of the intermediate stage fan section 26 is increasing as desired the logic then loops back to the entry point of the two-spool fan control algorithm (FCA) 200 to repeat the airspeed check.

If the speed of the intermediate stage fan section 26 is increasing as would be expected in this increase thrust scenario, but at a relatively slower rate than desired, the thrust from the intermediate stage fan section 26 is further increased through an open modulation of the LPT vanes 98 and a close modulation of the IPT vanes 94. The logic then loops back to the entry point of the two-spool fan control algorithm (FCA) 200.

Deceleration Scenario

Figure 3:
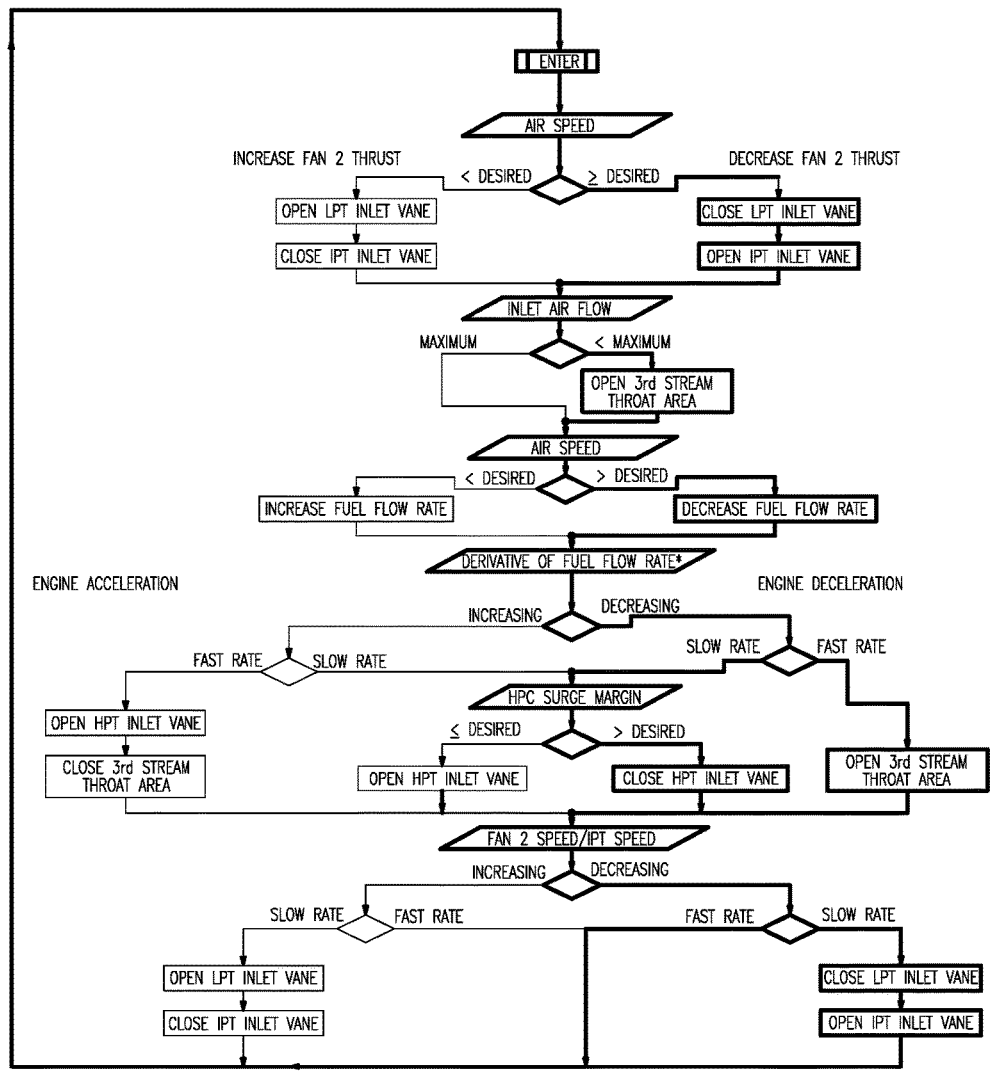
FIG. 3 is a block diagram of the two-spool fan control algorithm (FCA) of FIG. 2 for operation of the variable cycle two-spool gas turbine engine with the deceleration logic flow emphasized.

With reference to FIG. 3, under a scenario in which the aircraft airspeed is greater than desired, the engine 20 is decelerated as illustrated by the logic generally along the right side of the two-spool fan control algorithm (FCA) 200 diagram but is otherwise generally similar to the increase thrust scenario described above.

Initially, the thrust from the intermediate stage fan section 26 is decreased through a close modulation of the LPT vanes 98 and an open modulation of the IPT vanes 94. As inlet airflow has an impact on spillage drag, it is desired to always attempt to maximize inlet flow such that if inlet airflow is at maximum, the logic continues. If the inlet airflow is below maximum, the third stream bypass flow path 56 is modulated toward a more open position through the flow control mechanism 56F.

Then, airspeed is checked. The change in the third stream bypass flow path 56 has a relatively smaller impact of thrust capability, so if the thrust change was not that which is desired, the logic then changes the throttle and, in this decrease thrust scenario, decreases the fuel flow rate Then, there is the rate of change of the fuel flow schedule identified as the derivative of the fuel flow rate. So, if the desired change is rapid such as a snap deceleration, the third stream bypass flow path 56 is modulated toward a more open position through the flow control mechanism 56F. To effectuate the snap deceleration, the flow control mechanism 56F may be rapidly opened to force the first stage fan section 24 to be quickly at a lower pressure ratio. To also effectively accommodate the snap deceleration and assure the desired HPC surge margin, the HPT vanes 88 are modulated closed if the HPC section 28 surge margin is greater than desired or the HPT vanes 88 are modulate open if the HPC section 28 surge margin is less than desired to thereby accommodate the rapid thrust decrease.

If the desired airspeed change is relatively gentle, then, depending on whether or not there is adequate surge margin which is adjusted as described above, the logic basically passes through to the speed check of the intermediate stage fan section 26.

If the speed of the intermediate stage fan section 26 is decreasing as desired the logic then loops back to the entry point of the two-spool fan control algorithm (FCA) 200 to repeat the airspeed check.

If the speed of the intermediate stage fan section 26 is decreasing as would be expected in this decrease airspeed scenario, but at a relatively slower rate than desired, the thrust from the intermediate stage fan section 26 is further decreased through a close modulation of the LPT vanes 98 and an open modulation of the IPT vanes 94, the logic then loops back to the entry point.

The deceleration scenario provides no issue for the HPC section 28, however, the LPC section may be subject to surge such that control of the flow through the third stream bypass flow path 56 facilitates an effective change in operating line.

A steady state scenario in which flow through the engine 20 is in effective balance, the decisions would effectively flow through the center of the two-spool fan control algorithm (FCA) 200. That is, the first stage fan section 24 is speed matched to the intermediate stage fan section 26 and are in balance, the aircraft is at the desired airspeed, there is no spillage and there is a desired surge margin on the HPC and LPC.

The two-spool fan control algorithm (FCA) 200 further utilizes data such as a speed of the low spool 42, torque on the low spool 42, a speed of the intermediate spool 44, the throat area of the flow control mechanism 56F into the third stream bypass flow path 56, the throat area of the first stage variable stator 72 as well as data such as temperatures and others.

It should be understood that relative positional terms such as "forward," "aft," "upper," "lower," "above," "below," and the like are with reference to the engine but should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of operating a gas turbine engine comprising:
   modulating a variable high pressure turbine inlet guide vane of a high pressure spool to performance match a first stage fan section of a low pressure spool and an intermediate stage fan section of an intermediate spool to maintain a generally constant engine inlet flow while varying engine thrust;
   modulating a variable area throat of a third stream bypass flow path to a third stream exhaust nozzle downstream of said first stage fan section, wherein said third stream bypass flow path is radially outboard of a second stream bypass flow path and a core flow path and said variable area throat includes a flow control door located downstream of an inlet to said third stream bypass flow path and said intermediate stage fan section is located downstream of said inlet to said third stream bypass flow path; and
   modulating variable low pressure turbine inlet guide vanes in response to an airspeed;
   modulating variable intermediate pressure turbine inlet guide vanes along said intermediate spool in response to said airspeed; and
   modulating open said variable low pressure turbine inlet guide vanes in response to said airspeed being less than a desired airspeed; and
   modulating closed said variable intermediate pressure turbine inlet guide vanes along said intermediate spool in response to said airspeed being less than said desired airspeed.

2. The method as recited in claim 1, further comprising:
   modulating variable high pressure turbine inlet guide vanes along said high spool in response to a derivate of a fuel flow rate; and
   modulating a variable area throat of a third stream exhaust nozzle downstream of said first stage fan section in response to a derivate of a fuel flow rate.

3. The method as recited in claim 2, further comprising:
   modulating open said variable high pressure turbine inlet guide vanes along said high spool in response to the derivate of a fuel flow rate increasing; and
   modulating closed said variable area throat of a third stream exhaust nozzle downstream of said first stage fan section and said third stream bypass flow in response to the derivate of said fuel flow rate increasing.

4. The method as recited in claim 2, further comprising:
modulating open said variable area throat of a third stream exhaust nozzle downstream of said first stage fan section in response to the derivate of said fuel flow rate decreasing.

5. The method as recited in claim 1, further comprising:
modulating variable low pressure turbine inlet guide vanes in response to a speed of said intermediate stage fan section; and modulating variable intermediate pressure turbine inlet guide vanes along said intermediate spool in response to said speed of said intermediate stage fan section.

6. The method as recited in claim 1, further comprising:
modulating variable low pressure turbine inlet guide vanes in response to a speed of said intermediate stage fan section changing at a different desired rate; and modulating variable intermediate pressure turbine inlet guide vanes along said intermediate spool in response to said speed of said intermediate stage fan section changing at the desired rate.

7. The method as recited in claim 1, further comprising:
modulating closed said variable low pressure turbine inlet guide vanes in response to said airspeed being greater than a desired airspeed; and modulating open said variable intermediate pressure turbine inlet guide vanes along said intermediate spool in response to said airspeed being greater than said desired airspeed.

8. The method of claim 1, wherein said inlet to said third stream bypass flow path is downstream of said first stage fan section and upstream of said intermediate stage fan section.

9. The method of claim 8, wherein said inlet to said third stream bypass flow path is partially defined by an intermediate case structure.

10. A method of operating a gas turbine engine comprising:
modulating a variable high pressure turbine inlet guide vane of a high pressure spool to performance match a first stage fan section of a low pressure spool and an intermediate stage fan section of an intermediate spool to maintain a generally constant engine inlet flow while varying engine thrust;

modulating variable low pressure turbine inlet guide vanes in response to an airspeed;

modulating variable intermediate pressure turbine inlet guide vanes along said intermediate spool in response to said airspeed;

modulating open said variable low pressure turbine inlet guide vanes in response to said airspeed being less than a desired airspeed; and modulating closed said variable intermediate pressure turbine inlet guide vanes along said intermediate spool in response to said airspeed being less than said desired airspeed.

11. A method of operating a gas turbine engine comprising:
modulating a variable high pressure turbine inlet guide vane of a high pressure spool to performance match a first stage fan section of a low pressure spool and an intermediate stage fan section of an intermediate spool to maintain a generally constant engine inlet flow while varying engine thrust;

modulating variable low pressure turbine inlet guide vanes in response to an airspeed;

modulating variable intermediate pressure turbine inlet guide vanes along said intermediate spool in response to said airspeed;

modulating closed said variable low pressure turbine inlet guide vanes in response to said airspeed being greater than a desired airspeed; and modulating open said variable intermediate pressure turbine inlet guide vanes along said intermediate spool in response to said airspeed being greater than said desired airspeed.

\* \* \* \* \*